May 26, 1936.  F. L. McCULLOCH  2,042,267
AUTOMOBILE LICENSE PLATE LOCKING DEVICE
Filed Aug. 30, 1935  2 Sheets-Sheet 1
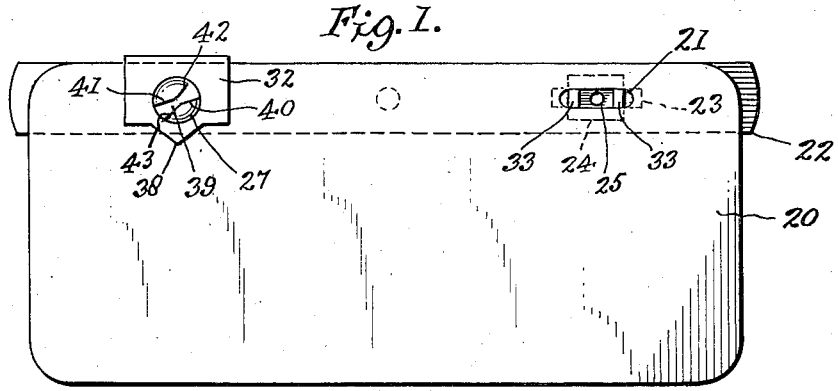
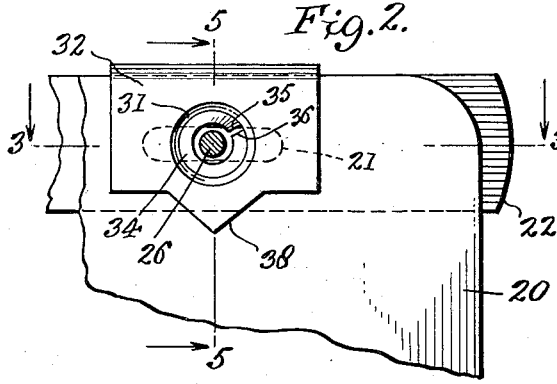
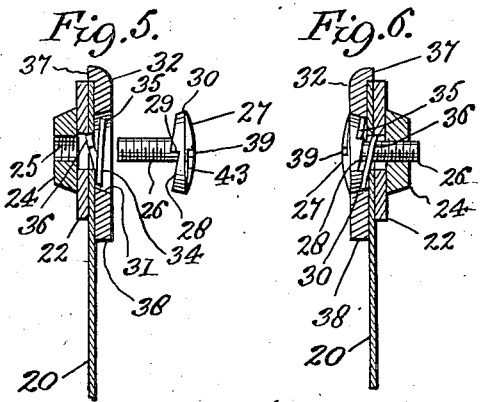
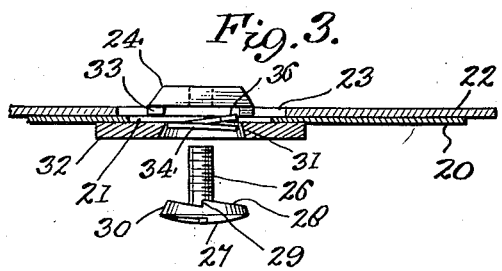
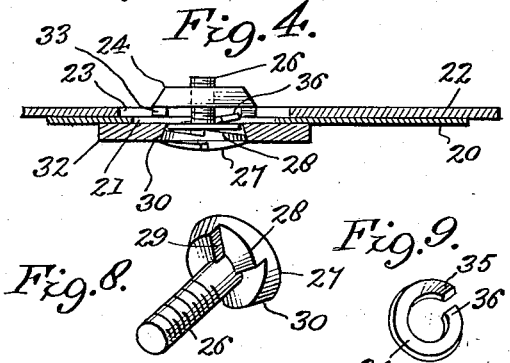
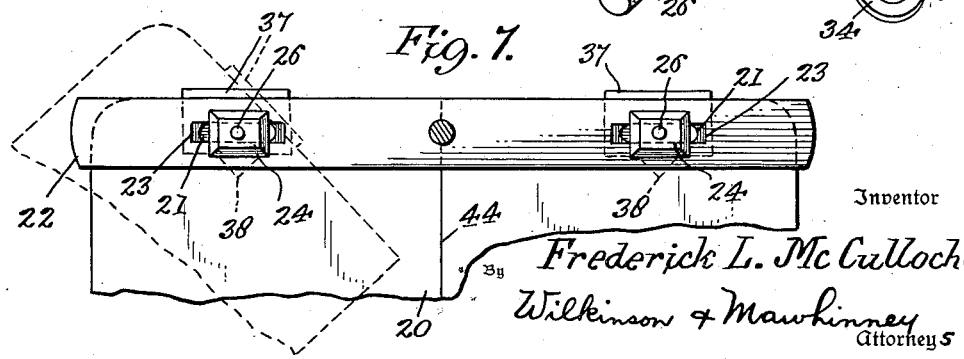
Inventor
Frederick L. McCulloch
By Wilkinson & Mawhinney
Attorneys

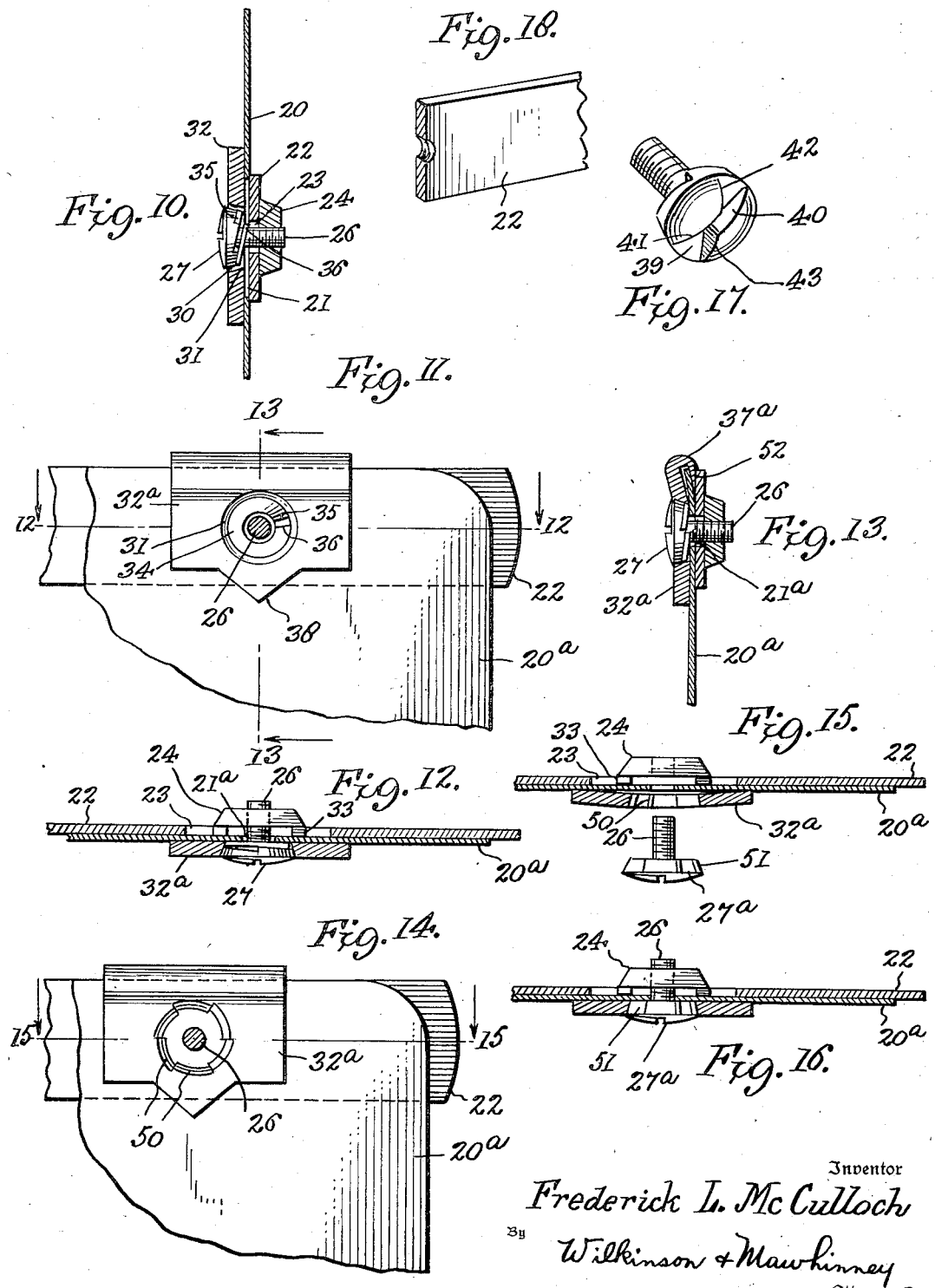

Patented May 26, 1936

2,042,267

UNITED STATES PATENT OFFICE 2,042,267

AUTOMOBILE LICENSE PLATE LOCKING DEVICE

Frederick L. McCulloch, Tampa, Fla.

Application August 30, 1935, Serial No. 38,627

2 Claims. (Cl. 40—125)

The present invention relates to improvements in license plate locking devices for automobiles, and has for an object to provide an improved device for effectively locking the license plates on automobiles to avoid theft thereof or the interchange of such license plates or tags.

Another object of the invention resides in providing an improved locking device for license plates and the like in which the mutilation of the license plate will be required before the device can be loosened or unlocked.

A further object of the invention is to provide an improved device of this character which will itself not become mutilated but will admit of its reuse over and over again.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a front elevation of a license plate and its holding and locking device constructed in accordance with the present invention.

Figure 2 is an enlarged fragmentary elevation showing a corner portion of the same.

Figure 3 is a cross section taken on the line 3—3 in Figure 2 with the screw removed.

Figure 4 is a similar view with the screw in locking position.

Figure 5 is a vertical section taken on the line 5—5 in Figure 2 with the screw removed and looking in the direction of the arrow.

Figure 6 is a similar view with the screw in locking position and taken in a direction reverse to the arrows of Figure 2.

Figure 7 is a rear view of the holder showing the tag mutilated and indicating the method of removal of the same.

Figure 8 is a perspective view of the screw employed.

Figure 9 is a similar view of the split washer.

Figure 10 is a view similar to Figure 6 but with the fragment of the tag rotated around sufficiently to cam out the spring washer.

Figure 11 is a fragmentary front elevation with the screw cut away and showing a modification.

Figure 12 is a horizontal section taken on the line 12—12 in Figure 11.

Figure 13 is a vertical section taken on the line 13—13 also in Figure 11.

Figure 14 is a fragmentary front elevation with the screw cut away and showing a further modification.

Figure 15 is a horizontal section taken on the line 15—15 in Figure 14 and with the screw removed.

Figure 16 is a similar view showing the locked position of the parts.

Figure 17 is a perspective view of the screw employed, and

Figure 18 is a sectional view showing a further modification.

Referring more particularly to the drawings 20 designates a license plate such as now commonly used upon automobiles containing the license number of the vehicle. These license tags are made out of metal and are formed with elongated slots 21 along their upper edges at opposite corner portions for the purpose of receiving fastening means, such as screws, bolts and nuts whereby the license plates are affixed to a bar support 22 which is also provided with elongated slots 23 for receiving such fastening means, slots being preferred to round openings in order to accommodate different distances between the fastening means necessitated by different sizes of license plates issued by authorities in the different States. The bar support 22 is held upon the automobile in accordance with a conventional arrangement.

In accordance with the invention a nut 24 is provided which nut is provided with a threaded bore 25 to receive the threaded shank 26 of a screw having the head 27. On the inner side of this head there are ratchet faces composed of the inclined walls 28 and the shoulders 29 at the lower portions of these inclined walls. The outer edge 30 of the head 27 is preferably tapered in order to correspond with a tapered seat 31 made in a protecting plate 32 which extends over a wide area of the license plate 20 in and about the fastening device.

The nut 24 is detachable from the bar 22 but is adapted to be placed against the rear portion of the same, such nut 24 having lugs or projections 33 for entering the slots 23 of the supporting bar 22. In this way the nut 24 is prevented from rotating.

The ratchet teeth or faces on the inner side of the screw head 27 cooperate with one edge of a split spring washer 34 having the offset ends 35 and 36 extending outwardly in opposite directions. The plate 32 may have a flange 37 along its upper edge overlying the top edge portion of the license plate 20; and this protection plate 32 may be given a V-shape or other formation 38 at its lower edge for the two-fold purpose of ornamentation and to increase the dimensions of the plate 32 whereby to require thieves or unauthorized persons who desire to remove the license plate 20 to cut out such a large area about the protective plate 32 that the attention of police would be immediately called to the display of such a license plate on an automobile; and therefore such license plate would be in itself a tell-tale of the unauthorized placing upon the vehicle of this license plate.

In the use of the device, the license plate 20 is placed against the holder bar 22 so that its upper slotted or perforated parts 21 register with the slots 23 of the supporting bar 22. The nuts 24 are placed with the lugs 33 in the slots 23, the protective plates 32 are placed over the face of the license plate 20, the spring washer 34 put in place either before or after the protective plates 32, and finally the screw 26 is inserted in place and screwed home in the threaded bore 25 of the nut 24.

When the screw is in final position, its head lies substantially flush within the protective plate 32, and it will be noted that the cross cut or slot 39 made in the outer face of the screw head 27 for receiving the screw driver is constructed with shoulders 40 and 41 but the cross cut is cut away at 42 and 43 whereby the screw may be rotated by the screw driver only in a clockwise direction for the purpose of screwing the shank 26 into the nut 24 but the screw driver will simply slip out of the slot and will have no shoulders to take against when effort is made to rotate the nut in a counterclockwise direction for the purpose of unlocking the device.

When the screw is in the locked condition shown in Figure 6, one of the shoulders 29 of its ratchet head engages one end 35 of the washer 34, the other end 36 of such washer engaging a wall of the slot 23 of the holder bar 22. The washer 34 will therefore be effective to prevent retrograde rotation of the screw. Moreover the protection plate 32 will substantially house the washer 34. The washer 34 being of spring steel cannot be cut by a hack-saw and will protect the bolt or screw from being cut away.

The license plate 20 may be removed from the improved locking device only by mutilation thereof, such for instance as cutting the license plate around two wide areas along the upper edge thereof about the two protection plates 32. This will immediately show that the license plate has been removed without authority. When the owner desires to remove the license plate at the end of the year and to fit the new license plate thereto, he will cut the license plate down the center as indicated at 44 in Fig. 7 and then rotate the halves of the license plate as indicated in dotted lines.

In so doing the license plate adjacent the slot 23 will cam out the end 36 of the spring from the slot 23 of the holder bar 22. The license plate is rotated in the direction of unscrewing of the fastening and after a few turns of this fragment of the license plate the screw 26 will be free and the remaining turns of the screw may be made by hand in order to detach the screw completely from the nut 24. The camming action of the license plate upon the spring washer is shown in Figure 10.

Referring more particularly to Figure 10, this figure shows the fragment of the license plate as having been rotated and the edge or wall of the slot 23 thereof engaging and sliding along the inclined sprung end portion of the washer 34 whereby to force or cam this washer out of its interlocking engagement with the supporting bar 22.

Referring more particularly to Figures 11, 12 and 13, a modification of the invention is illustrated herein, such modification being applicable to license plates 20ᵃ having round perforations 21ᵃ instead of the elongated slots such as shown at 21 in Figure 1. These round holes are made of only the approximate diameter of the shank of the fastening screw or bolt so as to freely admit the bolt or screw but leaving a very small margin of opening insufficient to admit the end of the spring washer.

In such case the end of the spring washer is forced so tightly against the face of the metal tag 20ᵃ adjacent the round opening 21ᵃ that it will indent the metal of the license plate or tag and thus form its own ratchet shoulder. In other words this end of the spring washer would be required to bite into the metal of the license plate and thus give the washer a firm purchase or hold upon the plate sufficient to avoid the rotation of the washer and the other parts. The remainder of this structure is the same as previously described.

Referring now to Figures 14, 15 and 16, a further modification of the invention is illustrated in which the spring washer is entirely dispensed with and a number of ratchet teeth and inclined surfaces 50 are made directly in the beveled wall of the opening in the protecting plate 32ᵃ. These ratchet faces 50 are arranged to mate with complemental ratchet faces 51 upon the inclined edge of the head 27ᵃ of the screw. When the screw is rotated home, as illustrated in Figure 16, the ratchet teeth 51 will interlock with the ratchet teeth 50 of the plate 32ᵃ and rotation will be avoided.

Also the plate 32ᵃ will not be allowed to rotate owing to the fact that its flange 37ᵃ has a depending part 52 lying upon the back of the license plate. In removing this fastening, the license plate is cut centrally and the two ends are rotated in the same manner as heretofore described. When the fragment of the license plate is rotated it will carry with it the protecting plate 32ᵃ and due to the ratchet teeth the screw will also be rotated around in a counter-clockwise direction so as to remove the screw from the nut.

In Figure 15 the normal condition of the parts is shown by the tightening of the screw 27ᵃ. This figure shows that the protecting plate 32ᵃ is slightly bowed. This plate 32ᵃ may or may not be made of spring material but when the screw 27ᵃ is fully tightened within the nut the bowed plate will be drawn tightly against the license plate, as shown in Figure 16. This bowed protecting plate will permit the ratchet teeth 50 and 51 to pass over the high points of one another and to settle down with the shoulders abutting one another.

Referring more particularly to Figure 18 in this case the nut is dispensed with and the threaded bore 25ᵃ to receive the screw is made directly in the supporting bar 22ᵃ.

Whenever throughout the specification and claims the word "nut" is used it will be understood that this term means either a separate nut, as shown in Figures 3 and 4, or a nut integral with the supporting bar, as shown in Figure 18.

It is obvious that various changes and modifications may be made in the details of construction and design of the above specifically described embodiment of this invention without departing from the spirit thereof, such changes and modifications being restricted only by the scope of the following claims.

I claim:—

1. In combination with a license plate having an opening therein and a support having an opening therein, a nut non-rotatively associated with said support, a screw having a threaded shank passing through the openings in said plate and support and treaded into said nut, said screw also having a head overlying the license plate with inclined ratchet faces and shoulders on the inner face of said head, a protective plate extending over a large area of the license plate about the screw having a large opening to receive the screw head, and a split spring washer having its ends out-turned in opposite directions seated substantially within the opening in said protective plate and having one end extending therethrough and engaging against a wall of the opening in said support and the other end engaging a shoulder of the screw head, a cut fragment of the license plate on rotation adapted to engage and cam the washer end out from engagement with the support.

2. In combination with a license plate having an opening therein and a support having an aligning opening, of a nut having lugs fitting non-rotatively against the walls of the opening of the support, a screw passing through the license plate and support and threaded in the nut, said screw having an enlarged head with a beveled edge and ratchet inclined faces and shoulders on its face, a large protective plate extending over a large area of the license plate about the screw and having a flanged edge overturned upon the upper edge of the license plate, said protective plate having an enlarged beveled opening therein to substantially receive the head of the bolt, and a split spring washer housed substantially within the opening in said protective plate with one of its ends extending through the last named opening and engaging against a wall of the opening of the support and the other end against a shoulder of the screw head.

FREDERICK L. McCULLOCH.